United States Patent [19]
Vespo

[11] 3,973,325
[45] Aug. 10, 1976

[54] RECORD GROOVING DEVICE

[76] Inventor: James A. Vespo, 7505 Montana St., Merrillville, Ind. 46410

[22] Filed: June 4, 1975

[21] Appl. No.: 583,601

[52] U.S. Cl. .................................. 33/27 M; 83/5; 274/1 R; 274/42 R
[51] Int. Cl.² ...................... B26D 3/06; G11B 1/00; B43L 11/06
[58] Field of Search ............... 83/1, 5, 6, 7, 12, 646, 83/523; 274/42 R, 1 R; 33/27 M, 27 C

[56] References Cited
UNITED STATES PATENTS

| | | | |
|---|---|---|---|
| 157,841 | 12/1874 | King | 33/27 M |
| 1,195,101 | 8/1916 | Schiffman | 274/1 R |
| 1,761,212 | 6/1930 | Knopp | 274/42 R X |
| 2,262,732 | 11/1941 | Gruber | 274/42 R |
| 2,595,795 | 5/1952 | Kovach | 274/42 R X |
| 3,125,344 | 3/1964 | Immendorf | 83/5 X |

Primary Examiner—Othell M. Simpson
Assistant Examiner—W. D. Bray
Attorney, Agent, or Firm—Walter Leuca

[57] ABSTRACT

A grooving device for making a groove between selected recording bands of a long playing record for selective playing thereof. A platen for supporting a record to be so altered. A spindle upstanding from the platen for placing a record centered on said spindle and platen, a radially extending arm removably mounted on the spindle for rotation relative to the record. The arm is formed to house a gear and a longitudinally movable rack bar engaging said gear. The distal end of the rack bar carrying a groove cutting blade. In mounting the radial arm onto the spindle and platen, the gear is keyed to the spindle so that upon rotating the arm over the record, the stationary spindle will cause the rack bar to move radially relative to the record causing the blade at the end thereof to cut a convolutely curved groove between one select band to another select band on the record.

2 Claims, 7 Drawing Figures

RECORD GROOVING DEVICE

BACKGROUND OF THE INVENTION

1. Field of the Invention

This invention relates generally to phonograph records and more particularly to a device for cutting grooves in a phonograph record.

2. Description of the Prior Art

In the present practice, long playing records are made with a plurality of recordings made popular by a performer. Frequently, a purchaser of such a record is interested in only several, but not all, of the recordings on the record. If these recordings which the purchaser enjoys hearing or is interested in are not grouped together, he will have to listen to all the recordings between several that he desires to hear or else at the completion of each recording, the listener will be required to lift the needle of the phonograph and place it on the band of the next recording that he wishes to hear. Playing such a record in this manner becomes distracting and laborious.

SUMMARY OF THE INVENTION

Accordingly, I have invented a manually operable record grooving device to cut a uniformly curved groove from the termination of a selected recording band to the beginning of another selected recording band, cutting through the recording bands that one does not wish to hear, thereby, permanently altering the record so that only the performances one wishes to hear will be automatically played.

I accomplish this by providing a table or platen for supporting the record to be so altered. The record receives a spindle through the center hole thereof. Also placed on the spindle is an arm which houses a gear keyed to the spindle. This gear engages the teeth of a rack bar housed in the arm longitudinally extensive thereof and laterally or radially crossing the recording bands of the record. At the end of the rack bar is provided a blade for cutting the groove from recording band to band by manually rotating the arm on the spindle.

Other objects and advantages of my invention will become more apparent after a more careful study of the following detailed description taken together with the accompanying drawings wherein is illustrated a preferred embodiment of my invention.

DESCRIPTION OF THE PREFERRED EMBODIMENT

Figure 4:
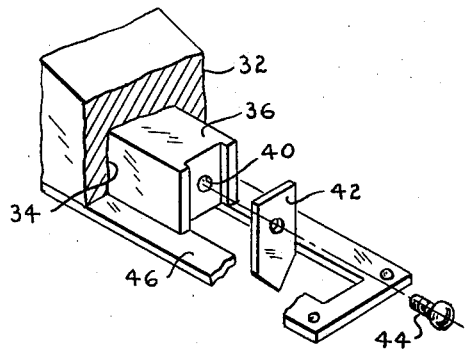
FIG. 4 is a perspective detail view of the blade end of the arm member showing portions thereof broken away and the blade in exploded relation with the rack bar.

With reference now to the drawings for a detail description of the preferred embodiment of my invention, numeral 10 designates the record groove cutting device in general. It comprises a base platen 12 formed circular in plan with a center hole 14 in which is fitted the end of spindle 16 so as to extend upright from base platen 12. Spindle 16 is keyed to base platen 12 by any convenient means to fix spindle 16 to base platen 12. The portion of spindle 16 extending above base platen 12 is provided with a longitudinal groove 18. Mounted on spindle 16 is radial arm member 20. Radial arm member 20 is formed with a hub end 22 through which is provided a shaft hole 24. The bottom end of shaft hole 24 has a circular or annular enlargement to receive pinion 26 and provide a clearance 28 for relative movement therebetween. The center hole of pinion 26 is formed with a key lug 30 formed to fit in groove 18 of spindle 16 to prevent rotational movement between pinion 26 and spindle 16. Radially extending arm portion 32 of arm member 20 is provided with a longitudinal channel 34 extending through the hub end 22 and opening into the annular opening at the bottom of shaft hole 24. Rack bar 36 is provided in longitudinal channel 34 for reciprocating sliding movement therein. Rack bar 36 is provided on one side thereof with gear teeth 38 for engagement with pinion 26. As more clearly shown in FIG. 4, the distal end of rack bar 36 is recessed and provided with threaded hole 40 for mounting thereon groove blade 42 and connected thereto by means of screw 44. Keeper plate 46 formed with a rectangular opening the length thereof is screw connected to the bottom of arm member 20 for retaining pinion gear 26 in the circular enlargement of hub end 22, and rack bar 36 in channel 34.

Figure 1:
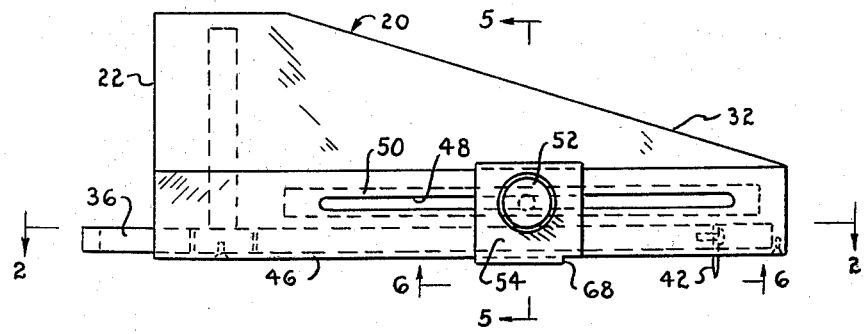
FIG. 1 is a side elevation of the grooving device of this invention.
Figure 5:
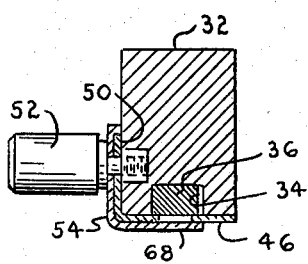
FIG. 5 is a detail view of the arm member sectioned along lines 5—5 of FIG. 1.
Figure 6:
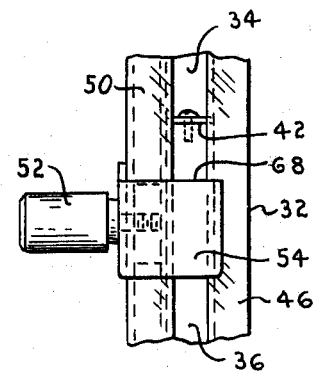
FIG. 6 is a bottom view of the arm member sectioned along lines 6—6 of FIG. 1.

As illustrated in FIGS. 1, 5 and 6, I provide a slotted opening 48 in the side of arm portion 32 of arm member 20 for receiving therein guide plate means 50 for tightening thereagainst thumb screw and nut combination 52. Thumb screw 52 tightens angle bracket 54 against the side of arm member 20. Angle bracket 54 extends to the bottom side of keeper plate 46 and across the rectangular opening thereof and serves as a stop for blade 42. I further provide resilient member 56 in the form of a flat circular cushion provided with a radial opening 70 to the center thereof. I form resilient member 56 from material which allows compression thereof under force and has elastic characteristics for resuming its normal thickness when the compression force is removed. Resilient member 56 is interposed between record 58 and arm member 20 and surrounds spindle 16 which is received in radial opening 70 to allow centering of resilient member 56. Resilient member 56 normally supports arm member 20 at an elevated level so that the cutting edge of blade 42 is spaced above record 58 to prevent contact of blade member 42 with record 58 until arm member 20 is pressed downwardly against the elasticity of resilient member 56.

Figure 7:
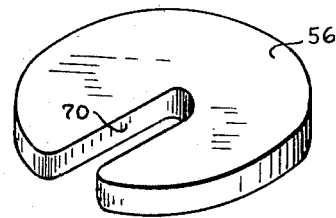
FIG. 7 is a perspective detail of the resilient support means for the arm member.
Figure 2:
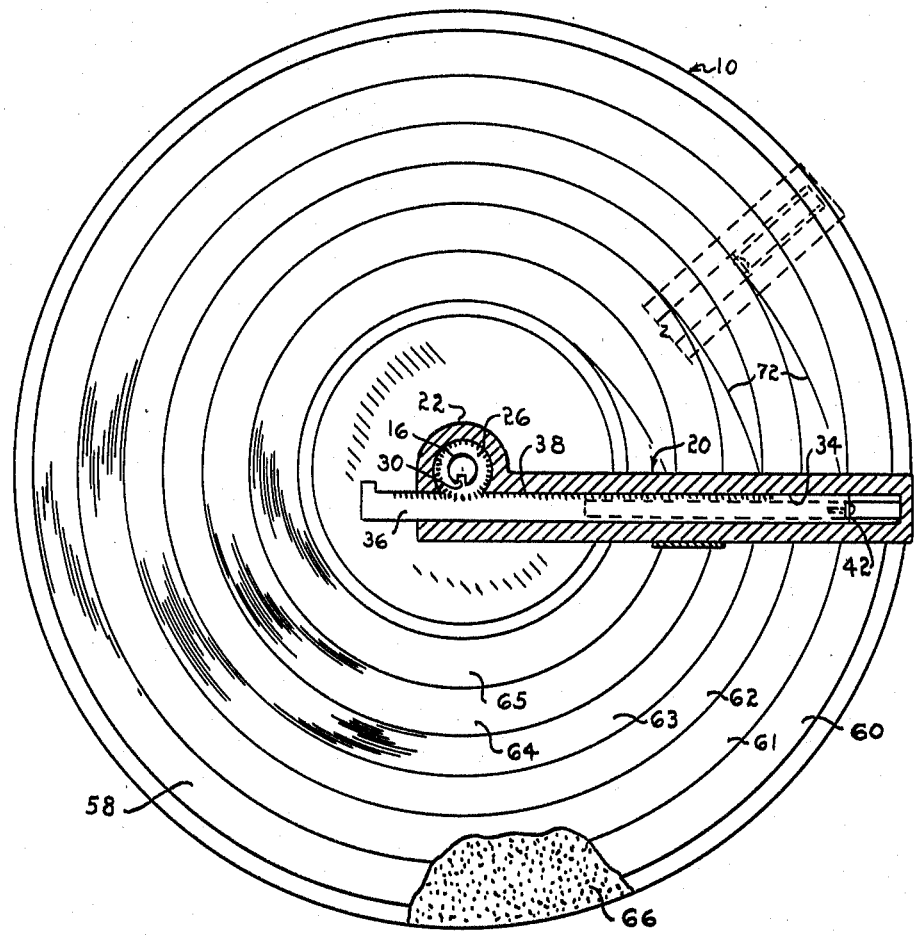
FIG. 2 is a top view of the grooving device of FIG. 1 reduced in size and sectioned along lines 2—2 of FIG. 1, and showing the grooving device mounted on a record which is shown broken in part.
Figure 3:
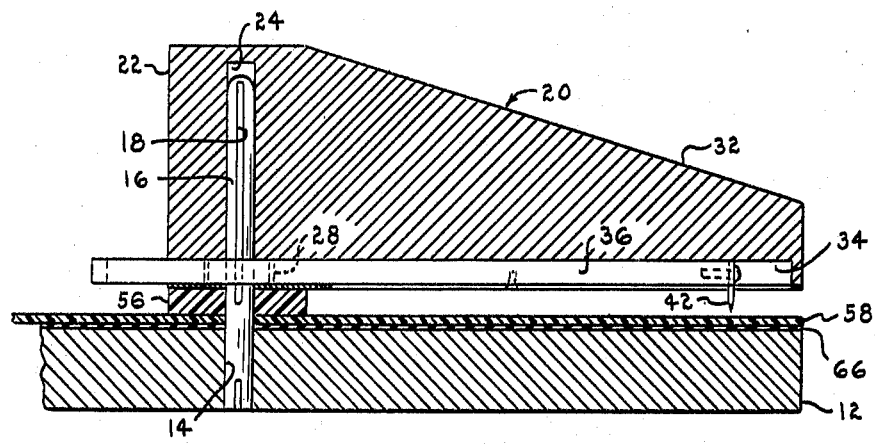
FIG. 3 is a longitudinal section view of the grooving device of this invention showing the platen and record thereon broken in part.

In the operation of this invention, a long playing record 58 having multiple recordings designated by numerals 60 through 65 as illustrated in FIG. 2, representing different individual recording bands, is placed on base platen 12 so that spindle 16 passes through the center hole of the record. Record 58 rests on a cushion sheet 66 bonded to base platen 12, having a gripping or non-slip characteristic which serves to cushion record 58 and frictionally hold the record from rotating during the grooving operation. Resilient member 56 of FIG. 7 is then placed over record 58 at spindle 16. Radial arm member 20 is then placed on spindle 16 and thereon lowered until arm member 20 rests on resilient member 56. I prefer to form member 56 out of, for example, elastomer material so that it may be easily compressed and has elastic qualities to resume its original thickness when the force of compression is released, and also to provide dimensional expanse so that a broad support to radial arm member 20 is provided. The top and bottom surfaces of resilient member 56 are calendarized or otherwise prepared to provide a sliding surface so as not to hinder or offer drag to the rotating motion of radial arm member 20. I then rotate arm 20 until the cutting edge of blade 42 is tangentally aligned with the terminal groove of a band to be reserved, for example, recording band 60. Radial arm member 20 is then pushed against resilient member 56 until the cutting edge of blade 42 is registered with the terminal groove of band 60 and then pivoted counterclockwise as shown in FIG. 2 until blade 42 registers with the initial groove of band 62 which is desired to be retained and cutting through any band therebetween which is not desired for retention. Since pinion 26 of radial arm member 20 is axially fixed to spindle 16 by means of longitudinal groove 18 and key lug 30 of pinion 26, the counterclockwise pivotal movement of arm 20 will cause rack bar 36, the teeth of which are engaged to pinion 26, to move to the left as shown in FIG. 2 causing blade 42 to generate a uniform convolute curve 72. When this operation is completed, the operator's compressive force is released and radial arm member 20 is removed from spindle 16 together with resilient member 56 and record 58.

As shown in FIGS. 1, 5 and 6, angle bracket 54 being adjustably movable relative to blade 42 by operation of thumb screw and nut assembly 52, the radial extent of the groove cut by blade 42 may be controlled. This feature of my invention is used for records where the several recording bands are not visually demarcated, for example, in long playing records where the performance is opera and the arias that one desires to hear are interspaced by performances which one does not desire to hear. In such cases, it would be required for such records to be played in advance and marks be made at the beginning and end of the performances desired to be eliminated. When blade 42 is moved radially outward, the knife edge of blade 42 registers with the terminal groove of the aria desired to be retained, thumb screw assembly 52 is loosened so that angle bracket 54 may be moved along longitudinal slot 48 until blade stop 68 of angle bracket 54 is aligned with the beginning groove of the succeeding aria to be retained so that when the groove cutting operation of my invention 10 is performed, the groove cutting operation will stop at the proper place when blade 42 abutts against stop 68 of angle bracket 44, even though the recording performances may not be visually demarcated.

I claim:
1. A record grooving device comprising:
a platen for supporting a record;
spindle means upstanding from said platen for centering said record;
a radially extending arm member rotatably mounted on said spindle, said arm member having a hub portion extending from said platen to the distal end of said spindle means, said hub portion of said arm member having a hole passageway for receiving said spindle in its entirety, said hole being annularly enlarged at the end thereof adjacent said platen, and a longitudinal channel extending the radial length of said arm member adjacent said platen opening in said annular enlarged part of said hole passageway;
a bar member longitudinally movable in said channel;
a cylindrical member in said annular part of said hole keyed to said spindle;
said cylindrical member and said bar member having means for rolling engagement therebetween;
a groove cutting means on said bar member; and
stop means adjustably positioned along the radial length of said arm member for stopping the longitudinal movement of said bar member at a preselect location.

2. The record grooving device of claim 1 wherein said arm member on said spindle means is further characterized as being vertically movable thereon.

* * * * *